(12) United States Patent
Brown et al.

(10) Patent No.: US 9,274,223 B2
(45) Date of Patent: Mar. 1, 2016

(54) SYSTEM FOR DETERMINING THE DISTANCE FROM AND THE DIRECTION TO AN OBJECT

(75) Inventors: Christopher Brown, Stuttgart (GB); Felix Streichert, Stuttgart (DE); Christian Zott, Bietigheim-Bissingen (DE); Andre Gerlach, Leonberg-Hoefingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 680 days.

(21) Appl. No.: 13/642,251

(22) PCT Filed: Apr. 19, 2011

(86) PCT No.: PCT/EP2011/056208
§ 371 (c)(1),
(2), (4) Date: Jan. 4, 2013

(87) PCT Pub. No.: WO2011/131650
PCT Pub. Date: Oct. 27, 2011

(65) Prior Publication Data
US 2013/0100774 A1    Apr. 25, 2013

(30) Foreign Application Priority Data
Apr. 20, 2010 (DE) .......................... 10 2010 027 972

(51) Int. Cl.
*G01S 15/93* (2006.01)
*G01S 13/46* (2006.01)
*G01S 15/46* (2006.01)

(52) U.S. Cl.
CPC .............. *G01S 15/931* (2013.01); *G01S 13/46* (2013.01); *G01S 2013/466* (2013.01); *G01S 2015/465* (2013.01)

(58) Field of Classification Search
CPC . G01S 15/931; G01S 13/46; G01S 2013/466; G01S 2015/465
See application file for complete search history.

(56) References Cited

U.S. PATENT DOCUMENTS 3,836,886 A * 9/1974 Mallinckrodt ................ 367/123
4,023,175 A   5/1977 Brown et al.
(Continued)

FOREIGN PATENT DOCUMENTS

DE   10 2006 005 048   2/2006
DE   10 2004 050 794   4/2006
(Continued)

OTHER PUBLICATIONS

International Search Report for PCT/EP2011/056208, dated Jul. 1, 2011.

*Primary Examiner* — Daniel Pihulic
(74) *Attorney, Agent, or Firm* — Kenyon & Kenyon LLP

(57) ABSTRACT

A system for determining the distance from and the direction to an object includes an emitter and at least two receiver elements for receiving a signal which is transmitted by the emitter and reflected by the object. The receiver elements are arranged as a linear array, as two linear arrays situated at an angle to one another, as an array which surrounds the emitter and forms a circle, or as a two-dimensional array. The diameter of the array may be greater than one-half the wavelength of the signal, and the receiver elements each have an individual surface area whose height or diameter corresponds at most to one-half the wavelength of the signal, and the emitter has a height or a diameter which is greater than one-half the wavelength of the signal.

5 Claims, 6 Drawing Sheets

(56) References Cited

U.S. PATENT DOCUMENTS

| | | | |
|---|---|---|---|
| 4,258,574 A | 3/1981 | Hildebrand et al. | |
| 5,235,857 A | 8/1993 | Anderson | |
| 2005/0088334 A1 | 4/2005 | Herder | |
| 2007/0291589 A1* | 12/2007 | Kawabata et al. | 367/88 |
| 2008/0148855 A1 | 6/2008 | Barbeau et al. | |
| 2008/0165620 A1 | 7/2008 | Sugiura | |
| 2013/0100774 A1* | 4/2013 | Brown et al. | 367/99 |

FOREIGN PATENT DOCUMENTS

| | | |
|---|---|---|
| DE | 10 2008 041 356 | 2/2010 |
| EP | 21 57 666 | 2/2010 |
| FR | 28 17 973 | 6/2002 |
| JP | 914 58 39 | 6/1997 |
| JP | 10153659 A | 6/1998 |
| JP | 2003 284 182 | 10/2003 |
| JP | 2003-339707 | 12/2003 |
| JP | 2004-125515 | 4/2004 |
| JP | 2006-242650 | 9/2006 |
| JP | 2006343309 A | 12/2006 |
| JP | 2007-24770 | 2/2007 |
| JP | 2009-121936 | 6/2009 |
| JP | 2009-225419 | 10/2009 |
| JP | 2009-264872 | 11/2009 |

* cited by examiner

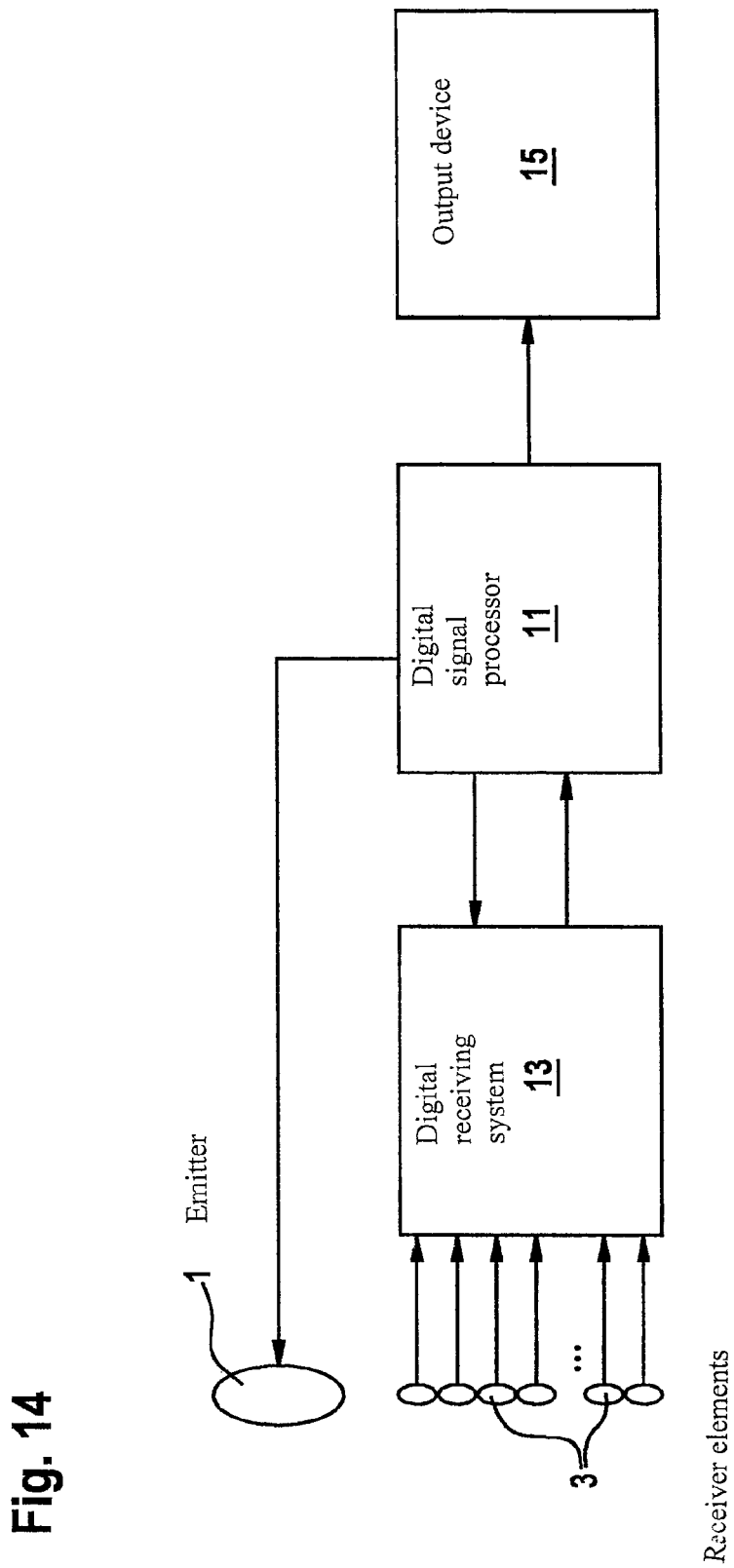

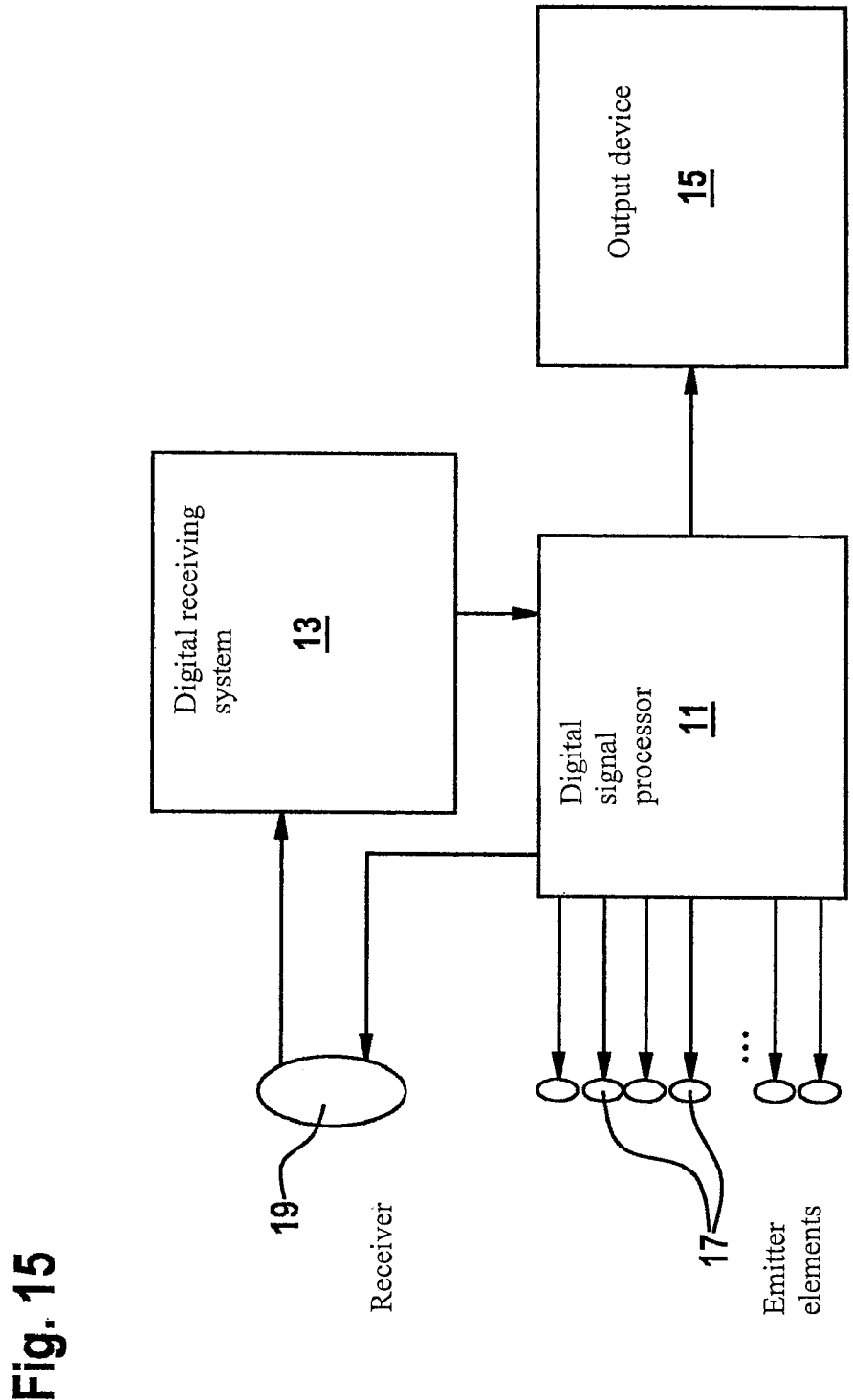

SYSTEM FOR DETERMINING THE DISTANCE FROM AND THE DIRECTION TO AN OBJECT

BACKGROUND OF THE INVENTION

1. Field of the Invention

The present invention is directed to a system and a method for determining the distance from and the direction to an object.

2. Description of the Related Art

For determining the distance from an object, sensors are usually used which emit a signal and receive an echo of the signal which is reflected by the object. The distance from the object is determined based on the propagation time of the signal from the point in time when the signal is transmitted until the echo is received.

In addition to the distance from an object, the direction in which the object is located is also usually of interest. In particular for applications in the automotive field, the information concerning the direction of an object as well as the distance information are essential. Distance information and direction information for objects are also of crucial importance in robotics, for example for obstacle recognition in near-field navigation.

To determine the direction of the object, trilateration methods may be used, in which the direction of the object is determined based on the distances to the object measured by at least two sensors. The disadvantages of the trilateration methods lie essentially in the problem with assignment, and thus, the ambiguity in the distance estimation and position when there are multiple reflectors in the scene. These ambiguities may typically be resolved only via multiple measurements from various positions, and so-called tracking methods.

Alternatively, the transmission and/or reception characteristics of an individual sensor are often so greatly limited that the detection range of the sensor allows the lateral or vertical positioning of an obstacle. In this case it is disadvantageous that the transmission and/or reception characteristics must be greatly limited in order to achieve position accuracies which are relevant in practice, so that a large number of sensors is necessary for monitoring the detection range.

In addition to triangulation methods for direction determination, beamforming methods in particular may also be used. In active beamforming methods, the phases of multiple parallel active emitters are precisely tuned to one another in order to control the angle of reflection of the main lobe of the superimposition of the transmitted signals. In passive beamforming methods, the phase information of multiple receivers recording in parallel is used to reconstruct the angle of incidence of a received signal. In many beamforming methods, the size of an array, in particular the diameter of the array, of multiple parallel active emitters, or for a passive method, of the array of multiple parallel recording receivers, is important, since the size of the array determines the range of a transmitted signal as well as the angle separation capability for a received signal. In addition, the distance between the array elements, i.e., the receivers in passive beamforming or the emitters in active beamforming, is also important (element spacing). In most beamforming methods, the element spacing should be less than or equal to one-half the wavelength of the signal, since otherwise, so-called grating lobes, i.e., side lobes in the transmission or reception characteristics on the order of magnitude of the main lobe, may appear which may result in ambiguities in the detection.

As a result of the element spacing being less than or equal to one-half the wavelength of the signal, the size of the usable array elements is limited. For this reason, most practical applications for acoustic waves and ultrasound are currently found in medical technology or underwater applications, since these allow a longer wavelength in the medium as well as greater element spacings. In addition, the coupling of the medium to the elements is much more favorable in water and in tissue than in air.

Applications in air, such as for obstacle recognition in the automotive field or in robotics, for example, require very small array elements having a diameter, for example, of less than 1.7 mm at 100 kHz, due to the necessary small element spacing as a function of the frequency used. Due to the poor coupling of the emitters and receivers to the medium air, large emitter surface areas in the case of emitters, or small masses/large surface areas in the case of receivers, are required. However, large surface areas for individual array elements are not achievable due to the required small element spacing between the array elements.

A system in which a transmitter and multiple receivers are arranged in an array is described in U.S. Patent Application Publication 2008/0165620, for example. However, the receivers are only conditionally suited for application in the automotive field, since the described thin film piezoelectric emitter is susceptible to mechanical strain. In addition, the system described in U.S. Patent Application Publication 2008/0165620 is used in conjunction with trilateration methods. These methods allow much larger emitters and receivers than beamforming methods. Therefore, it is assumed that the sensor described in U.S. Patent Application Publication 2008/0165620 is not suited for beamforming methods.

Beamforming methods for ascertaining the distance from and the direction to an object are described in French patent document 2 817 973 and German patent application publication 10 2004 050 794, for example. A disadvantage of the method described in French patent document 2 817 973 is that a homogeneous linear array is assumed, and in particular the function of transmission is not separated from the function of reception. In the method described in German patent application publication 10 2004 050 794, large emitters are implicitly assumed in order to achieve a narrow emitter characteristic. Although this patent describes an active beamforming, the large emitter surface as well as the narrow emitter characteristic conflicts with use as an active emitter array. In addition, the two transmitting frequencies used conflict with the approach described in this claim.

BRIEF SUMMARY OF THE INVENTION

A system according to the present invention for determining the distance from and the direction to an object includes an emitter and at least two receiver elements for receiving a signal which is transmitted by the emitter and reflected by the object, the receiver elements being arranged as a linear array, as two linear arrays situated at an angle to one another, as an array which surrounds the emitter and forms a circle, or as a two-dimensional array, whereby the diameter of the array may be much greater than one-half the wavelength of the signal, and the individual receiver elements each have an individual surface area whose height or diameter corresponds at most to one-half the wavelength of the signal, and the separate emitter has a height or a diameter which is greater than one-half the wavelength of the signal.

In one alternative embodiment, for determining the distance from and the direction to an object, the system according to the present invention includes at least two emitter elements and one receiver for receiving a signal which is transmitted by the emitter elements and reflected by the object, the emitter elements being arranged as a linear array, as two linear arrays situated at an angle to one another, as an array which surrounds the receiver and forms a circle, or as a two-dimensional array, whereby the diameter of the array may be much greater than one-half the wavelength of the signal, and the emitter elements each have a surface area whose height or diameter corresponds at most to one-half the wavelength of the signal, and the separate receiver has a height or a diameter which is greater than one-half the wavelength of the signal.

In both systems, it is important that the functions of transmission and of reception for the beamforming methods are separate. Thus, on the one hand the near-field detection range is expanded, and on the other hand this allows the task-specific dimensioning of the emitters and receiver components. Various exemplary embodiments based on the same principle are described below.

Within the scope of the present invention, "diameter" is understood to mean the diameter of a circle, or the long axis of an ellipse. "Height" is understood to mean the distance between a base and a point situated opposite from the base which is at the greatest distance from the base. Thus, the height of a triangle, for example, is the distance between the base and the vertex situated opposite from the base. In a square or rectangle, the height corresponds to the length of a side.

The emitters and receivers used may have any desired cross section. However, the emitters and receivers preferably have a circular or square cross section.

Unlike the situation for a so-called transceiver, which is simultaneously used as a transmitter and a receiver, with the aid of the system according to the present invention it is possible to also detect objects which are directly adjacent to the system. This is not possible with the transceiver, since in that case a signal is initially transmitted, and the transceiver is not able to receive an incoming signal until the transmitting diaphragm has deflected. For an ultrasonic sensor, for example, this time period generally results in a minimum distance of 20 cm at or beyond which the distance from an object may be measured.

The embodiment having one emitter and multiple receiver elements or one receiver and multiple emitter elements on the one hand allows objects to be detected which are directly adjacent to the system, and on the other hand, with the aid of a beamforming method, for example using passive Bartlett or Capon beamformers, allows the direction to an object to be determined without ambiguities.

In the specific embodiment having one receiver and multiple emitters, as a result of the surface area of the emitter elements which is smaller than one-half the wavelength of the signal it is possible to achieve an effective spacing of the individual emitter elements which corresponds at most to one-half the wavelength of the signal. An effective spacing is the distance between the midpoints of the emitter elements. An effective spacing of the individual emitter elements which corresponds at most to one-half the wavelength of the signal allows a larger number of emitter elements to be used. This results in an improved signal-to-noise ratio.

In the specific embodiment having one emitter and multiple receivers, as a result of the surface area of the receiver elements which is smaller than one-half the wavelength of the signal it is possible to achieve an effective spacing of the individual receiver elements which corresponds at most to one-half the wavelength of the signal. An effective spacing is the distance between the midpoints of the receiver elements. An effective spacing of the individual receiver elements which corresponds at most to one-half the wavelength of the signal allows a larger number of receiver elements to be used. This likewise results in an improved signal-to-noise ratio.

The system according to the present invention may be used, for example, as distance sensors on a motor vehicle. These are generally situated in the area of the front and/or rear bumper(s) of the motor vehicle. Due to the positioning in the bumper it is necessary for the system to also be stable against mechanical effects. The sensors may thus be protected from damage, in particular from road stone, or also from so-called "parking dings" when the bumper area is involved in a collision. To achieve this, ultrasonic transmitters are particularly preferably used as emitters. In this regard, transmitters based on piezoelectric elements are particularly suited. Piezoelectric elements which convert an incoming signal into an electric current are also preferably used as receiver elements.

To avoid the detection of ambiguities when one emitter and at least two receiver elements are used in the beamforming method, it is necessary that the receiver elements each have a height or a diameter that is at most one-half the wavelength of the transmitted signal. To detect a direction to an object, at least two receiver elements are used. However, a larger number of receiver elements is preferred, for example at least five receiver elements for linear arrays for strictly lateral resolution, in particular at least fifteen receiver elements for two-dimensional arrays for vertical and lateral resolution.

In one specific embodiment of the present invention, the receiver elements are arranged as a linear array. In this case, the receiver elements are usually adjacent to the emitter. However, it is also possible for the linear array to be interrupted, for example in the middle, and for the emitter to be present at this location. It is also possible to supplement the linear array with additional receiver elements outside the main line of the linear array.

If the receiver elements are arranged as two linear arrays situated at an angle to one another, these may be situated, for example, along the legs of a right-angled triangle. In this case, the emitter is preferably positioned within the vertex of the triangle. Alternatively, it is also possible, for example, for two linear arrays to intersect, and the emitter to be positioned at the point of intersection of the intersecting linear arrays. In addition to a right-angled intersection or the arrangement as legs of a right-angled triangle, the linear arrays situated at an angle to one another may also be situated at any other given angle to one another. However, the arrangement at a right angle is preferred.

As an alternative to a linear arrangement of the receiver elements, it is possible for the receiver elements to be arranged, for example, as a two-dimensional array and to enclose the emitter. In this case it is possible, for example, for the emitter to be centrally positioned between the receiver elements, and for the receiver elements to enclose the emitter in a circular manner, for example. The receiver elements may be arranged in one row or in multiple rows. For an emitter having a shape other than circular, the configuration of the array depends on the cross section of the emitter. Thus, for an emitter having a square cross section, for example, the receiver elements likewise form a square array.

Also for the system of a two-dimensional array which may have any desired shape, for example circular, square, or any other given shape, it is possible for the emitter to be situated next to the receiver elements. In this case, the receiver elements form an array which is separate from the emitter. However, in this case it is necessary that the position of the emitter outside the array be taken into account in the subsequent signal processing for determining the direction to and the distance from an object.

If the position of the emitter is outside the array, it is also possible for the system to include at least two emitters. It is thus possible, for example, for the emitters to be positioned on opposite sides of the array which is formed by the receiver elements. This has the advantage that the surroundings may be detected from various directions so that an even more precise detection of the surroundings is possible without having to move the sensor unit. Alternatively, one emitter may be combined with at least two arrays.

If at least one receiver and an array composed of emitter elements is used instead of the at least one emitter and the array composed of receiver elements, it is possible to arrange the receiver and the emitter elements in a similar manner as described above for one emitter and a array composed of receiver elements.

In this case, each of the emitter elements occupies the position of the receiver elements, and the receiver occupies the position of the emitter.

To determine the distance from and the direction to an object with the aid of the system according to the present invention, the at least one emitter transmits a signal, the signal is reflected by an object, and the reflected echo is received as an input signal by the receiver elements. The distance from and direction to the object are computed based on the input signal, using any given beamforming method.

Receiver beamforming methods carry out spatial filtering of the signals received by the receiver elements. Incident echoes are superimposed physically with respect to the individual signals which may be received by the spatially separated receiver elements. The received signals are subsequently subjected to electronically different amplification or damping factors, regardless of the direction in which the array is intended to be controlled. In the case of passive receiver beamforming methods, the various reception directions are frequently run through via software, while other methods based on an estimation of the number of received echoes are also able to directly estimate the various directions. In both cases, the relative positions of the receiver elements and the wavelength of the transmitted pulse are used. In their simplest, classical form, complex weightings are applied to the signals of the receiver elements, so that signals which originate from the desired "viewing direction" interfere constructively, whereas signals from other directions interfere destructively.

Transmitter beamforming methods function in a similar way, but in the opposite way. In this case, the signals transmitted by the emitter elements in the desired "viewing direction" are added, and signals from other directions cancel each other out. In this way, objects in the viewing direction deliver a stronger signal than objects in other directions.

In an active method for determining the distance from and the direction to an object, an array composed of multiple emitter elements and at least one separate receiver is used. This system allows perception of objects from a distance of 0 cm and greater. For obstacle detection, however, the entire surroundings must be scanned, thus increasing the detection time as a function of the grid resolution, even if tracking for the position determination is dispensed with.

In contrast, for a passive ultrasonic array a signal is emitted by at least one emitter and received by a receiver array. It is thus possible to detect signal-reflecting obstacles for the entire surroundings, using only one transmitted ultrasonic pulse. This design according to the present invention of the separate emitters and receiver elements once again has the advantage of improved near-field detection, but also allows the task-specific dimensioning of the emitters and receiver elements.

The system according to the present invention may be used, for example, as distance sensors in a motor vehicle, or also for obstacle recognition in near-field recognition in robotics. This is of particular interest for driverless transport systems, for example.

BRIEF DESCRIPTION OF THE DRAWINGS

FIG. 14 shows a process flow chart for a passive array.

FIG. 15 shows a process flow chart for an active array.

DETAILED DESCRIPTION OF THE INVENTION

Figure 1:
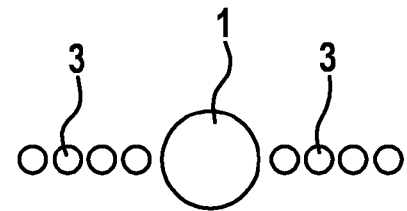
FIGS. 1 through 3 show systems having an emitter and receivers which are arranged as a linear array.
Figure 2:
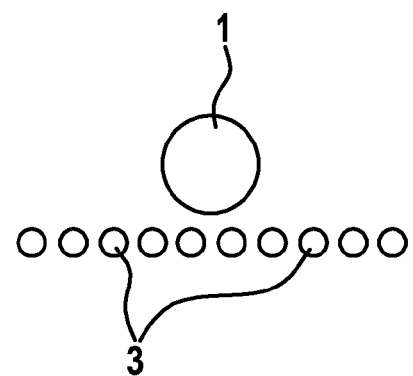
Figure 3:
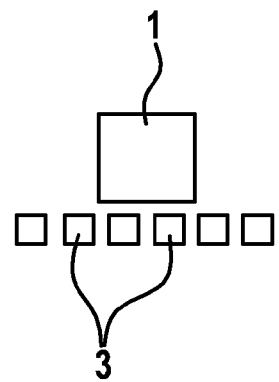

FIGS. 1 through 3 illustrate systems having an emitter and receiver elements which are arranged as a linear array. A system includes an emitter 1 and at least two receiver elements, in the specific embodiments illustrated here, eight receiver elements 3 in FIG. 1, ten receiver elements 3 in FIG. 2, and six receiver elements 3 in FIG. 3. Receiver elements 3 are arranged as a linear array, i.e., in a row next to one another. In the specific embodiment illustrated in FIG. 1, emitter 1 interrupts the array formed from receiver elements 3, and thus forms a part of the linear array.

According to the present invention, emitter 1 has a height or a diameter which is greater than one-half the wavelength of the signal. In contrast, receiver elements 3 have a height or a diameter which at most corresponds to one-half the wavelength of the signal. In the specific embodiment according to FIG. 1, emitter 1 and receiver elements 3 are designed with a circular cross section, so that in the present case the diameter is the controlling parameter.

In contrast to the specific embodiment illustrated in FIG. 1, in the specific embodiment illustrated in FIG. 2 emitter 1 is not part of a linear array, but instead is situated next to the linear array which is formed by receiver elements 3.

The distance between emitter 1 and receiver elements 3 may have any arbitrary value, but should not exceed the range of the emitted signal or its echo. Emitter 1 is preferably positioned as closely as possible to receiver elements 3. Also for the specific embodiment illustrated in FIG. 2, emitter 1 and receiver elements 3 have a circular cross section. The specific embodiment illustrated in FIG. 3 is different in this respect. In this case, the system corresponds to that illustrated in FIG. 2, except that emitter 1 and receiver elements 3 each have a square cross section. In this case, the height is the controlling parameter for the size of emitter 1 and receiver elements 3. The height corresponds to the side length of the square cross-sectional area of emitter 1 and receiver elements 3.

Figure 4:
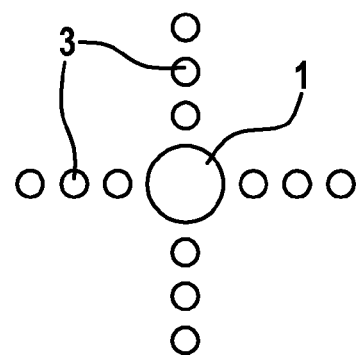
FIGS. 4 through 6 show systems having an emitter and receiver elements which are arranged as two linear arrays situated at an angle to one another, substitutional for a linear array having arbitrary additional elements outside the main axis.
Figure 5:
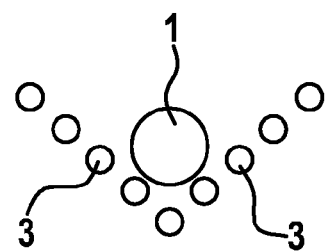
Figure 6:
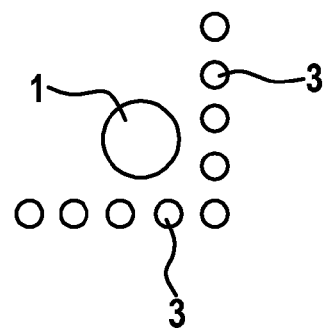

FIGS. 4 through 6 illustrate systems having an emitter 1 and receiver elements 3 in which receiver elements 3 form two linear arrays situated at an angle to one another.

In the specific embodiment illustrated in FIG. 4, receiver elements 3 form two linear arrays which intersect at their centers. The point of intersection of the two linear arrays formed by receiver elements 3 is occupied by emitter 1. In addition to the specific embodiment illustrated here, in which three receiver elements 3 in each case are adjacent to emitter 1 on one side, the number of receiver elements may also vary. Thus, for example, it is also possible for two, four, or even more receiver elements 3 in each case to be adjacent to emitter 1.

In the specific embodiments illustrated in FIGS. 5 and 6, the two linear arrays situated at an angle to one another, which are formed by receiver elements 3, form the legs of a right-angled triangle. In the embodiment in FIG. 5, the triangle stands on the vertex, whereas in the specific embodiment illustrated in FIG. 6 one linear array extends horizontally and the other linear array extends vertically at right angles thereto. In each case, emitter 1 is positioned in the vertex of the triangle formed by the linear arrays.

In addition to the specific embodiments illustrated in FIGS. 4 through 6, in which the linear arrays are situated at right angles to one another, the linear arrays may also be situated at any other given angle to one another. However, an arrangement at a right angle is preferred.

One embodiment having two-dimensional arrays is illustrated in FIGS. 7 through 13. In the specific embodiments in FIGS. 7 through 9, emitter 1 is enclosed by receiver elements 3 in each case, whereas in the specific embodiments according to FIGS. 10 through 13, emitter 1 is adjacent to receiver elements 3.

Figure 7:
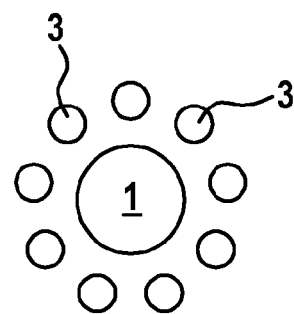
FIGS. 7 through 9 show systems having an emitter and receiver elements which are arranged as an array enclosing the emitter.
Figure 8:
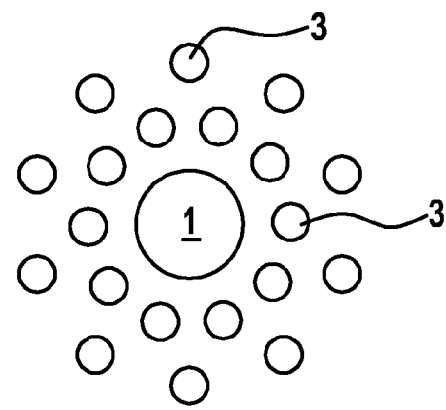

In the specific embodiment illustrated in FIG. 7, emitter 1 forms a center which is enclosed by receiver elements 3 in the shape of a ring. This is also the case for the specific embodiment illustrated in FIG. 8, except that, compared to the specific embodiment illustrated in FIG. 7, in the specific embodiment illustrated in FIG. 8 receiver elements 3 form two concentric rings. A system having more than two concentric rings which are formed by receiver elements 3 is also possible.

Figure 9:
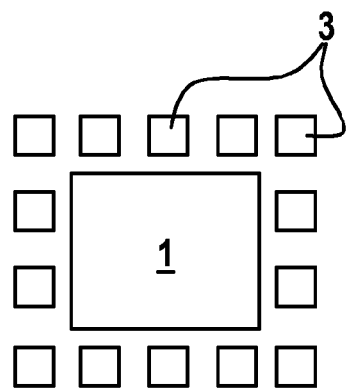

Depending on the shape and configuration of the array elements, various array designs may result in dense packings. For example, when receiver elements 3 have a circular cross section, as is the case in FIGS. 7 and 8, circular packings may be more advantageous, while for square or rectangular cross sections, regular packings are more advantageous, as illustrated in FIG. 9 as an example. In this case as well, emitter 1 is enclosed by receivers 3, the receivers according to the illustration in FIG. 9 being arranged in one row. Here as well, however, a system having more than only one row of receivers 3 on each side of emitter 1 is conceivable.

Figure 10:
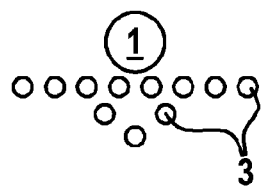
FIGS. 10 through 13 show systems having an emitter and receiver elements which are arranged as a two-dimensional array next to the emitter.

In the specific embodiments illustrated in FIGS. 10 through 13, in which emitter 1 is situated next to the array formed by receiver elements 3, FIG. 10 shows one specific embodiment which provides a reduced vertical resolution at a higher horizontal resolution. This is due to the fact that a full linear array is provided in the horizontal direction, but only three sensors are positioned next to the linear array. The three receiver elements 3 positioned next to the linear array form a triangle. A rotationally symmetrical reception characteristic with the smallest possible number of receiver elements 3 results in the specific embodiment illustrated in FIG. 11. In this case, the array formed by receiver elements 3 is circular.

Figure 11:
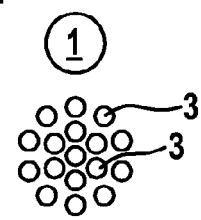
Figure 12:
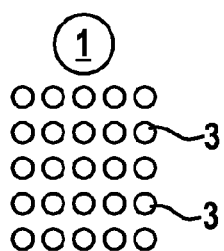

The system illustrated in FIG. 12 also provides an axially symmetrical reception characteristic, but a larger number of receiver elements 3 is required than for the circular arrangement as illustrated in FIG. 11. Depending on the beamforming method used, the angle separation capability achieved by the system in FIG. 12 may also be achieved by the system according to FIG. 13. However, in this case the number of receiver elements 3 is greatly reduced compared to a fully occupied array as illustrated in FIG. 12.

Figure 13:
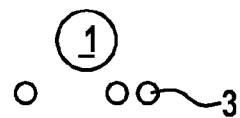
Figure 13:
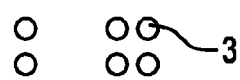

The system illustrated in FIG. 13 is also referred to as a so-called minimum redundancy array, which, depending on the beamforming method used, has an angle separation capability similar to that in the specific embodiment illustrated in FIG. 12, but has a poorer signal-to-noise ratio.

In the specific embodiments illustrated in FIGS. 2, 3, 5, 6, and 10 through 13, the position of emitter 1 may be selected as desired, but in this case must be taken into account in the subsequent signal processing. In the specific embodiments as illustrated in FIGS. 2, 3, 5, 6, and 10 through 13, it is also possible to use more than only one emitter. The use of more than one emitter allows the surroundings to be detected from various directions.

The advantage of the systems as illustrated in FIGS. 4 through 13 is that, in addition to a horizontal/lateral angular position of the object, a vertical angular position may also be ascertained.

It is advantageous to increase the number of receiver elements 3 in order to improve the signal-to-noise ratio. When emitter 1 is integrated into the array formed by receiver elements 3, the options for using efficient array designs via which the angle separation capability and the signal-to-noise ratio may be optimized as a function of the particular application are limited. Optimization without such constraints is possible using a system as illustrated in FIGS. 10 through 13, for example, having an emitter 1 positioned at the side of the array formed by receivers 3.

As an alternative to the illustrated specific embodiments in which one emitter 1 and an array composed of multiple receiver elements 3 are provided in each case, it is also possible to provide one receiver and an array composed of multiple emitter elements. In this case, each receiver then occupies the position of emitter 1 illustrated in FIGS. 1 through 13, and the array formed by the emitter elements occupies the position of the receiver elements illustrated in FIGS. 1 through 13.

FIG. 14 illustrates a configuration of a passive ultrasonic array having a separate emitter.

The configuration as illustrated in FIG. 14 combines the advantages of a larger range and reduced blindness in the near range. For the passive ultrasonic array it is particularly advantageous that the entire surroundings may be checked for ultrasound-reflecting obstacles, using only one transmitted ultrasonic pulse.

To detect the surroundings, a signal is initially transmitted to emitter 1 by a digital signal processor 11. An ultrasonic pulse 1 is emitted by the emitter in response to this signal. At the same time, a digital receiving system 13 is activated, thus activating an analog-digital conversion of digital receiving system 13.

Echoes, reflected by objects in the surroundings, of the ultrasonic pulse which has been emitted by emitter 1 are received by receiver elements 3. The received signals are relayed to digital receiving system 13 and converted into digital signals, which are relayed to digital signal processor 11. With the aid of the beamforming method, the distance from and the direction to an object are determined in digital signal processor 11 based on the high-frequency scanned phase information of the signals received in parallel. The obtained results may be output via an output device 15, for example.

Instead of an output device 15 or in addition to output device 15 it is also possible to relay the data ascertained in digital signal processor 11 to other applications which may, for example, process the data. In particular for applications in robotics it is common, for example, to relay the data determined in digital signal processor 11 to a control unit for a robot, the control unit using these data for controlling the robot.

FIG. 15 illustrates a configuration of an active ultrasonic array having a separate sensor. In contrast to the passive ultrasonic array as illustrated in FIG. 14, for an active ultrasonic array a receiver 19 and an array composed of multiple emitter elements 17 are provided. To detect the surroundings of the system, emitter elements 17 are activated by digital signal processor 11 to transmit an ultrasonic pulse. It is possible for emitter elements 17 to emit a signal having different phases in each case, so that the irradiated energy may be oriented in the superimposition of the signals (i.e., beamforming). Thus, signals may be sent in one direction in a targeted manner, or the surroundings may be sequentially scanned for obstacles by transmitting multiple transmission pulses in succession in various directions.

At the same time, digital signal processor 11 also activates receiver 19. Signals received by receiver 19 are converted into digital signals by digital receiving system 13. These digital signals are subsequently provided to digital signal processor 11. The distance now results from the propagation time of the signal, and the direction results from the selected emission characteristic of the emitter array. These data may be displayed once again via an output device 15 and/or used for other processes.

Due to the sequential transmission of a signal by emitter elements 17, the specific embodiment illustrated in FIG. 15 has the disadvantage that a longer detection time is necessary in order to detect the entire surroundings. It is therefore preferred to use a system as illustrated in FIG. 14, having one emitter 1 and multiple receiver elements 3.

What is claimed is:

1. A system for determining the distance from and the direction to an object for object recognition in air, the system being configured as a distance sensor provided in the region of a bumper of a vehicle, comprising:
   at least two emitter elements for transmitting signals, wherein the at least two emitter elements are ultrasound transmitters; and
   at least two receivers for receiving the signals transmitted by the emitter elements and reflected by the object, wherein the at least two receivers have an effective distance which corresponds at most to one half the wavelength of the signal, the effective distance being a distance between the midpoints of the at least two receivers;
   wherein:
   the emitter elements are arranged as one of: (i) a linear array, (ii) two linear arrays situated at an angle to one another, (iii) an array which surrounds the receivers and forms a circle, or (iv) a two-dimensional array;
   the diameter of the array is greater than one-half the wavelength of the signal;
   the emitter elements each contain a surface area having one of a height or a diameter corresponding to at most one-half the wavelength of the signal; and
   the two receivers have one of a height or a diameter which is greater than one-half the wavelength of the signal.

2. The system as recited in claim 1, wherein the emitter elements are arranged as a two-dimensional array and enclose the receiver.

3. The system as recited in claim 1, wherein the receiver is situated next to the emitter elements.

4. The system as recited in claim 1, wherein at least two active arrays are provided so that at least one: (i) an area is exposed to signals from multiple directions; and (ii) an area is exposed to signals using multiple frequencies in parallel.

5. A method for determining the distance from and the direction to an object for object recognition in air, comprising:
   providing a system configured as a distance sensor provided in the region of a bummer of a vehicle, wherein the system includes:
      at least two emitter elements for transmitting signals, wherein the at least two emitter elements are ultrasound transmitters; and
      at least two receiver elements for receiving the signals transmitted by the emitter elements and reflected by the object, wherein the at least two receiver elements have an effective distance which corresponds at most to one half the wavelength of the signal, the effective distance being a distance between the midpoints of the at least two receiver elements;
   wherein:
   the emitter elements are arranged as one of: (i) a linear array, (ii) two linear arrays situated at an angle to one another, (iii) an array which surrounds the receiver elements and forms a circle, or (iv) a two-dimensional array;
   the diameter of the array is greater than one-half the wavelength of the signal;
   the emitter elements each contain a surface area having one of a height or a diameter corresponding to at most one-half the wavelength of the signal; and
   the two receivers have one of a height or a diameter which is greater than one-half the wavelength of the signal;
   transmitting signals by the at least two emitter elements, wherein the are reflected by the object;
   receiving the reflected signals as input signals by the at least two receiver elements; and
   computing the distance from and the direction to the object based on the input signals using a beam-forming method.

* * * * *